US011143255B2

(12) United States Patent
Adkins et al.

(10) Patent No.: US 11,143,255 B2
(45) Date of Patent: Oct. 12, 2021

(54) BRAKE ASSEMBLY HAVING A RETRACTION SPRING AND METHOD OF ASSEMBLY

(71) Applicant: ArvinMeritor Technology, LLC, Troy, MI (US)

(72) Inventors: Alex Adkins, Troy, MI (US); Phil Leicht, South Lyon, MI (US); Daniel Philpott, Goodrich, MI (US); Sukrut Sakhare, Goodrich, MI (US); Chris Polmear, Southfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 84 days.

(21) Appl. No.: 16/407,395

(22) Filed: May 9, 2019

(65) Prior Publication Data
US 2020/0355232 A1    Nov. 12, 2020

(51) Int. Cl.
*F16D 65/68* (2006.01)
*F16D 65/00* (2006.01)
*F16D 65/092* (2006.01)

(52) U.S. Cl.
CPC ......... *F16D 65/68* (2013.01); *F16D 65/0075* (2013.01); *F16D 65/092* (2013.01)

(58) Field of Classification Search
CPC .... F16D 65/68; F16D 65/092; F16D 65/0075; F16D 65/0975; F16D 65/097; F16D 2055/0029; F16D 2065/1396
See application file for complete search history.

(56) References Cited

U.S. PATENT DOCUMENTS

| 4,491,204 | A |  | 1/1985 | Dirauf et al. |
| 5,511,638 | A | * | 4/1996 | Tsuruta ............... F16D 65/0975 188/72.3 |
| 5,549,181 | A | * | 8/1996 | Evans ................... F16D 65/097 188/216 |
| 8,857,575 | B2 |  | 10/2014 | Philpott |
| 2018/0106309 | A1 | * | 4/2018 | Fricke .................. F16D 55/226 |
| 2018/0106313 | A1 |  | 4/2018 | Fricke et al. |
| 2019/0293133 | A1 | * | 9/2019 | Brandl ............... F16D 65/0975 |

FOREIGN PATENT DOCUMENTS

| CN | 101603574 A | 12/2009 |
| EP | 1241369 A2 | 9/2002 |
| EP | 2557330 A1 | 2/2013 |
| JP | 2003148525 A | 5/2003 |
| JP | 2009127715 A | 6/2009 |
| WO | 2014097098 A1 | 6/2014 |
| WO | 2017060515 A1 | 4/2017 |
| WO | 2018234665 A1 | 12/2018 |

OTHER PUBLICATIONS

Extended European Search Report dated Oct. 8, 2020 for European Appln. No. 20173009.0; 8 Pages.
Chinese Office Action dated Jul. 19, 2021, for related Chinese Appln. No. 202010321399.9; 11 Pages.

* cited by examiner

*Primary Examiner* — Xuan Lan Nguyen
(74) *Attorney, Agent, or Firm* — Brooks Kushman PC

(57) ABSTRACT

A brake assembly having a retraction spring and a method of assembly. The retraction spring may extend between first and second brake pad assemblies. The retraction spring may include a coil and may have an end or tip that may be received in a hole in a backplate of a brake pad assembly.

20 Claims, 10 Drawing Sheets

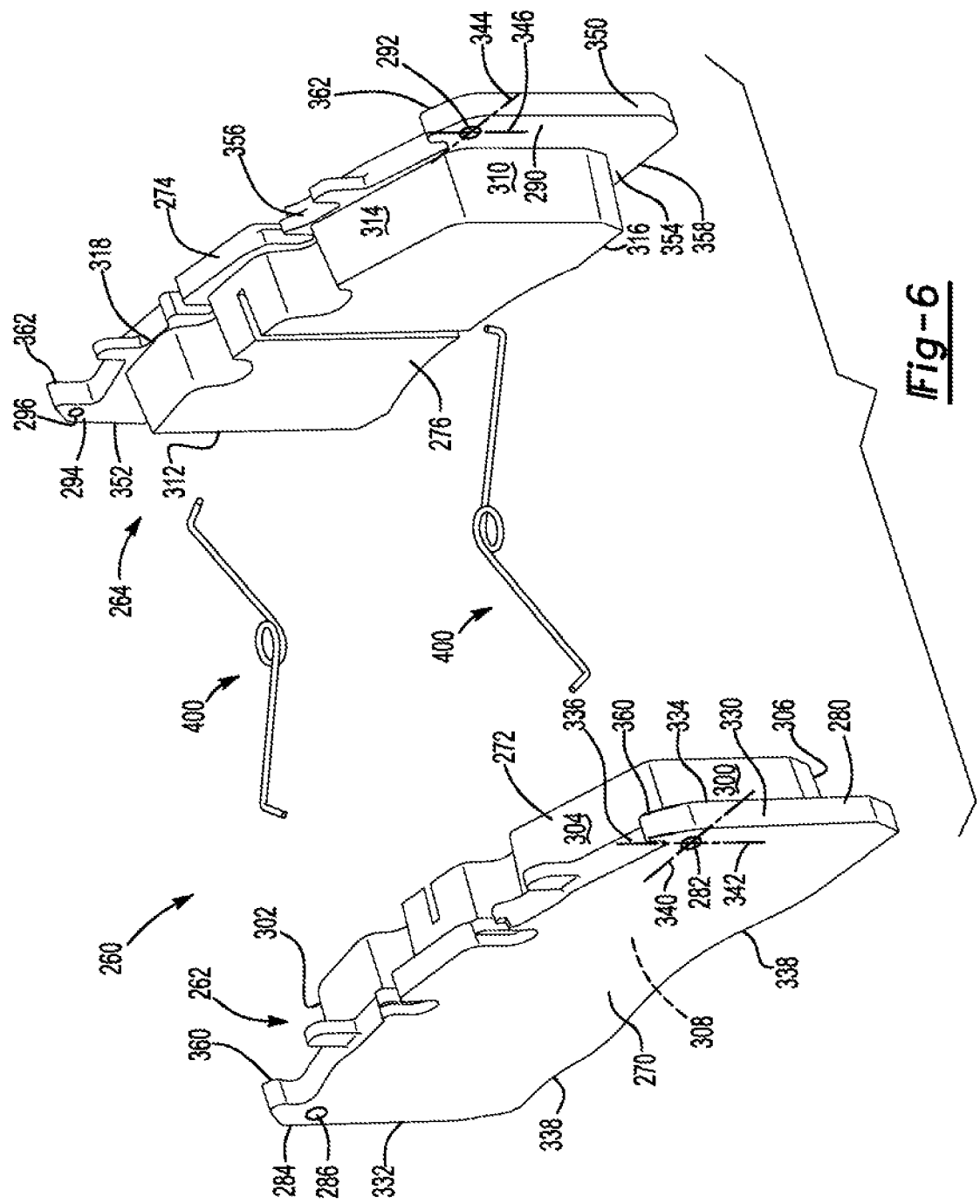

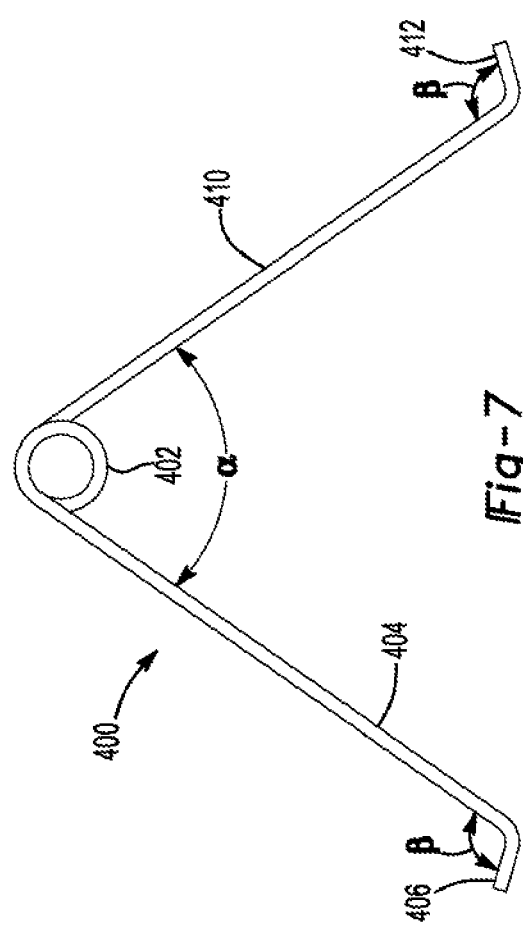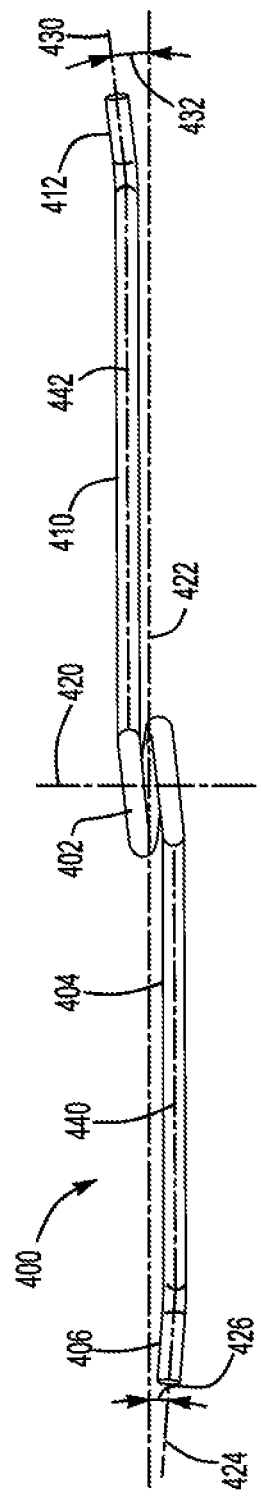

BRAKE ASSEMBLY HAVING A RETRACTION SPRING AND METHOD OF ASSEMBLY

TECHNICAL FIELD

This disclosure relates to a brake assembly having a retraction spring and a method of assembly.

BACKGROUND

A brake assembly is disclosed in U.S. Pat. No. 8,857,575.

SUMMARY

In at least one embodiment, a brake assembly is provided. The brake assembly may include a first brake pad assembly and a retraction spring. The first brake pad assembly may include a friction material and a first backplate. The friction material may include a first lateral side, a second lateral side, an upper side, and a back side. The second lateral side may be disposed opposite the first lateral side. The upper side may extend from the first lateral side toward the second lateral side. The back side may extend between the first lateral side and the second lateral side. The first backplate may include a first lateral backplate side, a second lateral backplate side, a first backplate face, and, a first hole. The second lateral backplate side may be disposed opposite the first lateral backplate side. The first backplate face may engage the back side of the friction material and may extend from the first lateral backplate side to the second lateral backplate side. The first hole may extend from the first backplate face and may be positioned along a lateral axis between the first lateral side and the first lateral backplate side and may be positioned along a longitudinal axis below the upper side of the friction material. The retraction spring may be partially received in the first hole.

In at least one embodiment, a brake assembly is provided. The brake assembly may include a first brake pad assembly and a retraction spring. The first brake pad assembly may include friction material and a first backplate. The friction material may have a first lateral side, a second lateral side, an upper side, a lower side, and a back side. The second lateral side may be disposed opposite the first lateral side. The upper side may extend from the first lateral side toward the second lateral side. The lower side may be disposed opposite the upper side and may extend from the first lateral side toward the second lateral side. The back side may extend between the first lateral side and the second lateral side. The first backplate may have a first lateral backplate side, a second lateral backplate side disposed opposite the first lateral backplate side, a first backplate face, and a first hole. The first backplate face may engage the back side of the friction material and may extend from the first lateral hack plate side to the second lateral back plate side. The first hole may extend from the first backplate face and may be, positioned laterally inboard with respect to the first lateral backplate side and laterally outboard with respect to the first lateral side. The retraction spring may be partially received in the first hole.

In at least one embodiment, a method of assembling a brake assembly is provided. The method may include providing first and brake pad assemblies that each include a friction material and a backplate. A retraction spring may be provided that includes a coil, first and second biasing arms, and first and second tips. The coil may extend around a central axis and may intersect a center plane that extends perpendicular to a central axis. The first and second biasing arms may extend from the coil. The first and second tips may extend at oblique angles and may be positioned in holes in the backplates of the first and second brake pad assemblies, respectively.

BRIEF DESCRIPTION OF THE DRAWINGS

FIG. 6 is an exploded view showing brake pad assemblies and retraction springs in a free state.

FIG. 7 is a top view of a retraction spring of FIG. 6 in the free state,

FIG. 8 is a side view of the retraction spring in the free state.

DETAILED DESCRIPTION

As required, detailed embodiments of the present invention are disclosed, herein; however, it is to be understood that the disclosed, embodiments are merely exemplary of the invention, that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
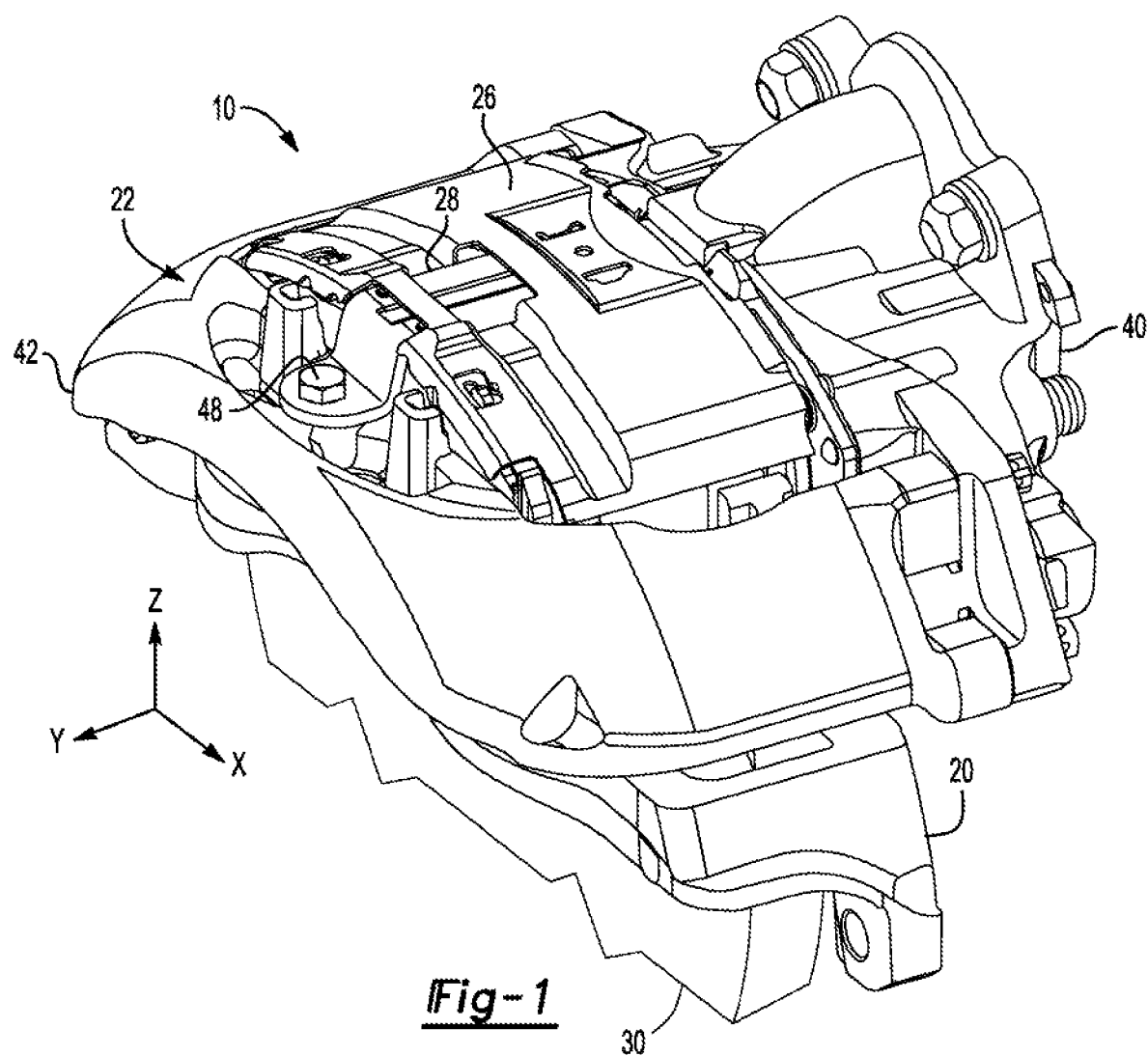
FIG. 1 is a perspective view of an example of a brake assembly.
Figure 2:
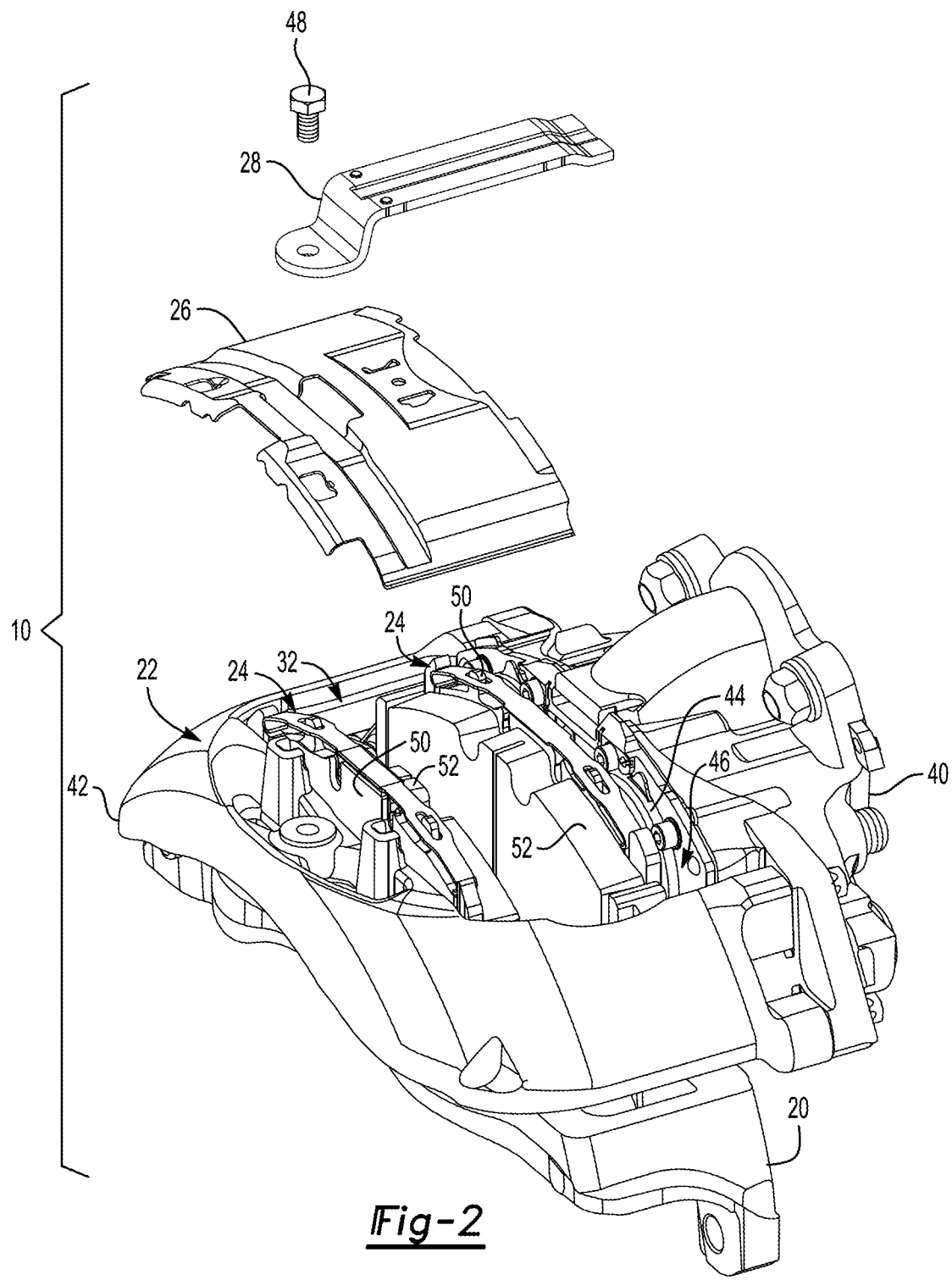
FIG. 2 is a partially exploded view of the brake assembly.

Referring to FIGS. 1 and 2, an example of a brake assembly 10 is shown. The brake assembly 10 may be provided as part of a vehicle, such as a motor vehicle like a truck, bus, farm equipment, military transport or weaponry vehicle, or cargo loading equipment for land, air, or marine vessels. In at least one embodiment, the brake assembly 10 may include a brake carrier 20, a housing assembly 22, a plurality of brake pad assemblies 24, a pad shield 26, a retainer bracket 28, and a rotor 30.

The brake carrier 20 may be fixedly mounted to the vehicle. For example, the brake carrier 20 may be directly or indirectly mounted to an axle assembly or a steering knuckle. The brake carrier 20 may receive and/or support the brake pad assemblies 24 and may include a rotor opening 32 that may be configured to receive the rotor 30 (the rotor is not shown in FIG. 2 for clarity). As such, the brake carrier 20 may straddle the rotor 30 and help position the brake pad assemblies 24 on opposite sides of the rotor 30.

The housing assembly 22 may receive various components of the brake assembly 10. In addition, the housing assembly 22 may facilitate positioning of the brake pad assemblies 24 with respect to the rotor 30 to Meditate braking of the vehicle. In at least one configuration, the housing assembly 22 may include a caliper housing 40 and a caliper bridge 42.

The caliper housing 40 may be movably disposed on the brake carrier 20. For example, the caliper housing 40 may be slidably disposed on a pair of slide pins that may be fixedly disposed on the brake carrier 20. The caliper housing 40 may receive an actuator 44, such as at least one piston, that may actuate the brake pad assemblies 24 into engagement with the rotor 30. For example, the actuator 44 may actuate a brake pad assembly 24 that is disposed proximate the caliper housing 40 into engagement with the rotor 30 and a reaction force may then move the caliper housing 40 and caliper bridge 42 to actuate the brake pad assembly 24 disposed proximate the caliper bridge 42 into engagement with an opposite side of the rotor 30 to help slow rotation of the rotor 30 and an associated vehicle wheel.

The caliper bridge 42 may be integrally formed with or may be, fixedly disposed on the caliper housing 40. For example, the caliper bridge 42 may be coupled to the caliper housing 40 with one or more fasteners, such as a bolt. In at least one configuration, the caliper bridge 42 may cooperate with the caliper housing 40 to at least partially define an opening 46. The brake pad assemblies 24, pad shield 26, and or retainer bracket 28 may be at least partially disposed in the opening 46.

The brake pad assemblies 24 may be configured to engage opposite sides of the rotor 30 to slow the rotation of a vehicle wheel. The brake pad assemblies 24 may have similar or identical configurations.

Referring to FIG. 2, the brake pad assemblies 24 may have similar or identical configurations. In at least one approach, the brake pad assemblies 24 may include a backplate 50 and a friction material 52.

The backplate 50 may be a structural member of a brake pad assembly 24. The backplate 50 may be made of any suitable material, such as metal or a metal alloy.

The friction material 52 may be disposed on the backplate 50. The friction material 52 may face toward the rotor 30 and may engage the rotor 30 during vehicle braking.

Referring to FIGS. 1 and 2, the pad shield 26, if provided, may extend partially or completely across the opening 46. The pad shield 26 may help shield the friction material 52 of the brake pad assemblies 24 from water or contaminants.

The retainer bracket 28 may secure the pad shield 24 to the housing assembly 22. For example, the retainer bracket 28 may have a first end that may engage the caliper housing 40 or may be received in a notch the caliper housing 40 and a second end that may be fixedly coupled to the caliper bridge 42 such as with a fastener 48 like a bolt.

Figure 3:
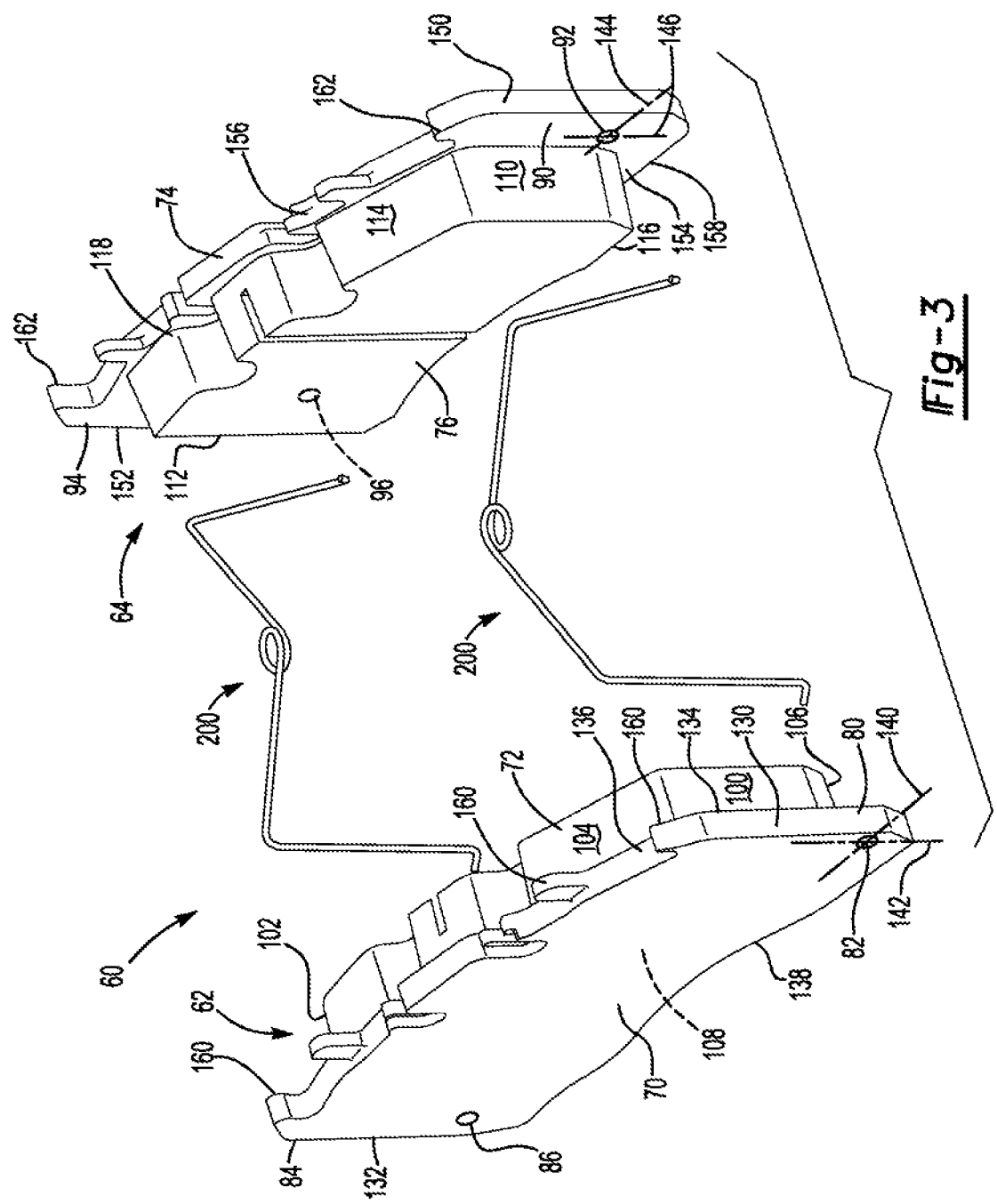
FIG. 3 is an exploded view showing brake pad assemblies and retraction springs in a free state.

Referring to FIG. 3, an assembly 60 for a brake caliper may be provided. The assembly 60 may include a first brake pad assembly 62 and a second brake pad assembly 64. The first and second brake pad assemblies 62, 64 may generally correspond to the brake pad assemblies 24 of FIG. 2. The first brake pad assembly 62 may include a first backplate 70 and a first friction, material 72 that may be secured to the first backplate 70. The second brake pad assembly 64 may include a second backplate 74 and a second friction material 76 that may be secured to the first backplate 70. The first and second backplates 70, 74 and first and second friction materials 72, 76 may correspond to the bookplates 50 and friction material 52 of FIG. 2. In the assembled configuration, the second brake pad assembly 64 may be spaced apart from the first brake pad assembly 62.

The first backplate 70 may include a first end portion 80 that may extend beyond the first friction material 72. The first backplate 70 may also include a first engagement interface 82. The first engagement interface 82 may be at least partially disposed, for example, at an inboard surface of the first end portion 80. The first engagement interface 82 may be provided at a lower region of the first end portion 80. For example, the first engagement interface $2 may be provided within the lower half of a height of the first backplate 70. As another example, the first engagement interface 82 may be provided within the lower third of a height of the first backplate 70. More particularly, the first engagement interface 82 may be provided within the lower quarter of a height of the first backplate 70.

In at least one approach, the first engagement interface 82 includes a receptacle that extends into the first backplate 70. In one example, the receptacle may be a hole. As such, the first engagement interface 82 may be, referred to as a first hole 82 herein. The first hole 82 may be a through hole that extends through an entire thickness of the first backplate 70. In another example, the receptacle may be a blind hole that extends through less than an entire thickness of the first backplate 70. In still another approach, the first engagement interface includes a protrusion that may extend from the first backplate 70 (e.g, in a direction toward the second backplate 74). In still another approach, the first engagement interface 82 may include a plurality of receptacles, a plurality of protrusions, or a combination of one or more receptacles with one or more protrusions.

The first backplate 70 may further include a first diametric end portion 84 that may extend beyond the first friction material 72 opposite the first end portion 80. The first backplate 70 may also include a first diametric engagement interface 86. The first diametric, engagement interface 86 may be at least partially disposed, for example, at an inboard surface of the first diametric end portion 84. The first diametric engagement interface 86 may be provided at a lower region or the first diametric end portion 84. For example, the first diametric engagement interface 86 may be provided within the lower half of a height of the first backplate 70. As another example, the first diametric engagement. Interface 86 may be provided within the lower third of a height of the first backplate 70. More particularly, the first diametric engagement. Interface 86 may be provided within the lower quarter of a height of the first backplate 70.

In at least one approach, the first diametric engagement interface 86 includes a receptacle that extends into the first backplate 70. In one example, the receptacle may be a hole. As such, the first diametric engagement interface 86 may be referred to as a first diametric hole 86 herein. The first diametric hole 286 may be a through hole that extends through an entire thickness of the first backplate 70. In another example, the receptacle may be a blind bole that extends through less than an entire thickness of the first backplate 70. In still another approach, the first engagement interface includes a protrusion that may extend from the first backplate 70 (e.g., in a direction toward the second backplate 74). In still another approach, the first diametric engagement interface 86 may include a plurality of receptacles, a plurality of protrusions, or a combination of one or more receptacles with one or more protrusions.

The second backplate 74 may include a second end portion 90 that may extend beyond the second friction material 76. The second backplate 74 may also include a second engagement interface 92. The second engagement interface 92 may be at least partially disposed, for example, at an inboard surface of the second end portion 90. The second engagement interface 92 may be provided at a lower region of the second end portion 90. For example, the second engagement interface 92 may be provided within the lower half of a height of the second backplate 74. As another example, the second engagement interface 92 may be provided within the lower third of a height or the second backplate 74. More particularly, the second engagement interface 92 may be provided within the lower quarter of a height of the second backplate 74.

In at least one approach, the second engagement interlace 92 includes a receptacle that extends into the second backplate 74. In one example, the receptacle may be a hole. As such, the second engagement interface 92 may be referred to as a second hole 92 herein. The second hole 92 may be a through hole that extends through an entire thickness of the second backplate 74. In another example, the receptacle may be a blind hole that extends through less than an entire thickness of the second backplate 74. In still another approach, the second engagement interface includes a protrusion that may extend from the second backplate 74 (e.g., in a direction toward the second backplate 74). In still another approach, the second engagement interface 92 may include a plurality of receptacles, a plurality of protrusions, or a combination of one or more receptacles with one or more protrusions.

The second backplate 74 may further include a second diametric end portion 94 that may extend beyond the second friction material 76 opposite the second end portion 90. The second backplate 74 may also include a second diametric engagement interface 96. The second diametric engagement interface 96 may be at least partially disposed, for example, at an inboard surface of the second diametric end portion 94. The second diametric engagement interface 96 may be provided at a lower region of the second diametric end portion 94. For example, the second diametric engagement interface 96 may be provided within the lower half of a height of the second backplate 74. As another example, the second diametric engagement interface 96 may be provided within the lower third of a height of the second backplate 74. More particularly, the second diametric engagement interface 96 may be provided within the lower quarter of a height of the second backplate 74.

In at least one approach, the second diametric engagement interface 96 includes a receptacles that extends into the second backplate 74. In one example, the receptacle may be a hole. As such, the second diametric engagement interface 96 may be referred to as a second diametric hole 96 herein. The second diametric hole 96 may be a through hole that extends through, an entire thickness of the second bookplate 74. In another example, the receptacle may be a blind hole that extends through less than an entire thickness of the second backplate 74. In still another approach, the second engagement interface includes a protrusion that may extend from the second backplate 74 (e.g., in a direction toward the second backplate 74). In still another approach, the second diametric engagement interface 96 may include a plurality of receptacles, a plurality of protrusions, or a combination of one or MOM receptacles with one or more protrusions.

In at least one approach, the first friction material 72 may have a first lateral side 100 and a second lateral side 102. The second lateral side 102 may be disposed opposite the first lateral side 100. The first friction material 72 may funkier include an upper side 104. The upper side 104 may extend from the first lateral side 100 toward the second lateral side 102. The first friction material 72 may further include a lower side 106. The lower side 106 may be disposed opposite the upper side 104. The lower side 106 may also extend from the first lateral side 100 toward the second lateral side 102. The first friction material 72 may, further include a back side 108. The back side 108 may extend between the first lateral side 100 and the second lateral side 102. The first lateral side 100 may extend between an end of the upper side 104 to an end of the lower side 106. The first lateral side 100 may by disposed parallel to the second lateral side 102.

In at least one approach, the second friction material 76 may have a first lateral side 110 and a second lateral side 112. The second lateral side 112 may be disposed opposite the first lateral side 110. The second friction material 76 may further include an upper side 114. The upper side 114 may extend from the first lateral side 110 toward the second lateral side 112. The second friction material 76 may further include a lower side 116. The lower side 116 may be disposed opposite the upper side 114. The lower side 116 may also extend from the first lateral side 110 toward the second lateral side 112. The second friction material 76 may further include a back side 118. The back side 118 may extend between the first lateral side 110 and the second lateral side 112.

In at least one approach, the first backplate 70 may have a first lateral backplate side 130 and a second lateral backplate side 132. The second lateral backplate side 132 may be disposed opposite the first lateral backplate side 130. The first backplate 70 may further include a first backplate face 134. The first backplate face 134 may engage the back side 108 of the friction material 52. The first backdate face 134 may extend from the first lateral backdate side 130 to the second lateral backplate side 132.

The first backplate 70 may have an upper backplate side 136 and a lower backdate side 138. The lower backplate side 138 may be disposed opposite the upper bookplate side 136. The upper side 104 and the upper backdate side 136 may face away from the lower side 106 and the lower backplate side 138.

The first hole 82 may extend from the first backplate face 134. The first hole 82 may be positioned along a lateral axis 140 between the first-lateral side 100 and the first lateral backplate side 130. The first hole 82 may be positioned along a longitudinal axis 142 below the upper side 104, such as between the upper side 104 and the lower side 106 of the friction material 52. In at least on approach, the first hole 82 may be disposed closer to the lower side 106 than the upper side 104. The first hole 82 may be disposed closer to first lateral side 100 than to the first lateral backdate side 130. The first hole 82 may be completely disposed between the upper side 104 and the lower side 106 of the friction material 52. The first hole 82 may be disposed closer to the lower backplate side 138 than the upper bookplate side 136.

In at least one approach, the second backdate 74 may have a first lateral backplate side 150 and a second lateral backplate side 152. The second lateral backplate side 152 may be disposed opposite the first lateral backplate side 150. The second backplate 74 may further include a first backplate face 154. The first backplate face 154 may engage the back side 118 of the second friction material 76. The first backdate face 154 may extend from the first lateral backplate side 150 to the second lateral backplate side 152.

The second backplate 74 may have an upper backplate side 155 and a lower backplate side 158. The lower backplate side 158 may be disposed opposite the upper backplate side 156. The upper side 114 and the upper backdate side 156 may face away from the lower side 116 and the lower backplate side 158.

The second hole 92 may extend from the first backplate face 154. The second hole 92 may be positioned along a lateral axis 144 between the first lateral side 110 and the first lateral backplate side 150. The second hole 92 may be positioned along a longitudinal axis 146 below the upper side 114, such as between the upper side 114 and the lower sale 116 of the second friction material 76. In at least one approach, the second hole 92 may be disposed closer to the lower side 116 than the upper side 114. The second hole 92 may be disposed closer to first lateral side 110 than to the first lateral backplate side 150. The second hole 92 may be completely disposed between the upper side 114 and the lower side 116 of the second friction material 76. The second hole 92 may be disposed closer to the lower backplate side 158 than the upper backplate side 156.

The first backplate 70 may have a plurality of tabs 160 that extend from the upper backplate side 136. The tabs 160 may extend in a direction that extends away from the lower backplate side 138.

The second backplate 74 may have a plurality of tabs 162 that extend from the upper backplate side 156. The tabs 162 may extend in a direction that extends away from the lower backplate side 158.

The assembly 60 may further include one or more retraction springs 200. Although depicted with two retraction springs, the assembly 60 may be provided with one retraction spring, or three, or more retraction springs. The retraction springs may be made of a wire that may have a substantially circular cross section. In at least one embodiment, the diameter of the wire may be approximately 3.0 mm. The wire may be made of any suitable material, such as metal or a metal alloy. In at least one configuration, the wire may be made of stainless steel to inhibit corrosion.

Figure 4:
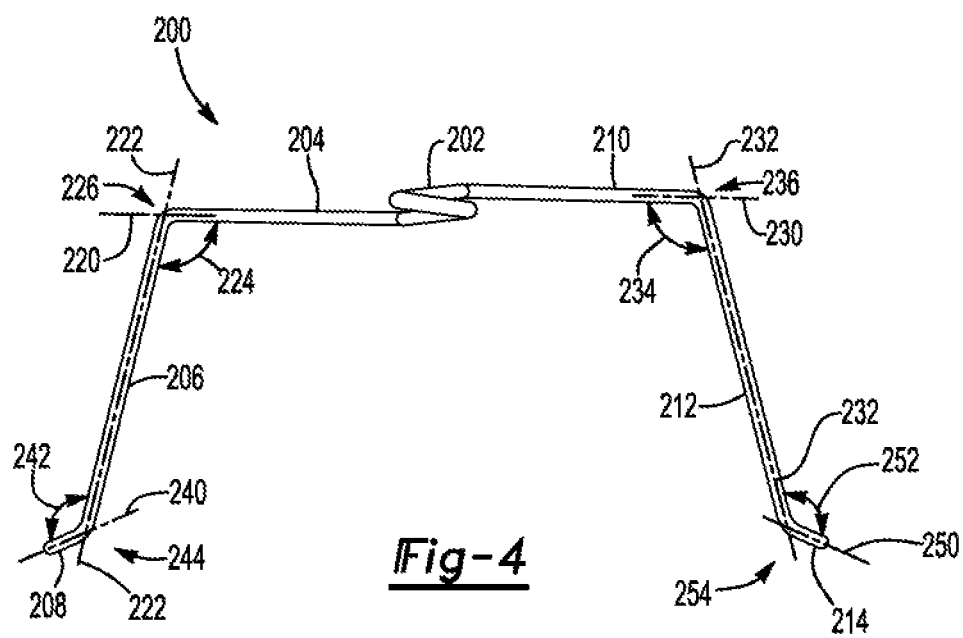
FIG. 4 is a side view of the retraction spring of FIG. 3 in the free state.

Referring to FIG. 4, a retraction spring 200 may include a coil 202. The coil 202 may include a single coil or may include multiple coils. The coil 202 may be substantially circular and may have a nominal diameter of between 6.5 and 8.0 mm in one or more embodiments. The retraction spring 200 may further include a first upper biasing arm 204. The first upper biasing arm 204 may extend from the coil 202. The retraction spring 200 may further include a first lower biasing arm 206. The first lower biasing arm 206 may extend from the first upper biasing arm 204. The first lower biasing arm 206 may be longer than the first upper biasing arm 204. The retraction spring 200 may further include a first tip 208. The first tip 208 may extend from and end of the first lower biasing arm 206.

The retraction spring 200 may further include a second upper biasing arm 210. The second upper biasing atilt 210 may extend from the coil 202 at an angle with respect to the first upper biasing arm 204. As a non-limiting example, the angle may be between 50 and 180 degrees in the free state. The retraction spring 200 may further include a second lower biasing arm 211. The second lower biasing arm 212 may extend from an end of the second upper biasing arm 210. The second lower biasing arm 212 may be longer than the second upper biasing arm 210. The retraction spring 200 may further include a second tip 214. The second tip 214 may extend from an end of the second lower biasing arm 212.

In an uncompressed configuration or free state as shown in FIG. 4, the first lower biasing arm 206 may extend from the first upper biasing arm 204 such that a central axis 220 of the first upper biasing arm 204 and a central axis 222 of the first lower biasing arm 206 define angle 224 therebetween. In at least one approach, the angle 224 is an obtuse angle; i.e., in the range of greater than 90 degrees to less than 180 degrees. As such, the retraction spring 200 may define a first bend 226 between the first upper biasing arm 204 and the first lower biasing arm 206.

Also in the uncompressed configuration, the second lower biasing arm 212 may extend from the second upper biasing arm 210 such that a central axis 230 of the second upper biasing arm 210 and a central axis 232 of the second lower biasing arm 212 define an angle 234 therebetween. In at least one approach, the angle 234 is an obtuse angle; i.e., in the range of greater than 90 degrees to less than 180 degrees. As such, the retraction spring 200 may define a second bend 236 between the second upper biasing arm 210 and the second lower biasing, arm 212. The first and second lower biasing arms 206, 212 may extend away from each other in the free state and may extend away from each other to a lesser degree or at a lesser angle in the compressed state.

The first tip 208 may extend from the first lower biasing arm 206 such that the central axis 222 of the first lower biasing arm 206 and a central axis 240 of the first tip 208 define an angle 242 therebetween, in at least one approach, the angle 242 is an obtuse angle; i.e., in the range of greater than 90 degrees to less than 180 degrees. As such, the retraction spring 200 may define a third bend 244 between the first lower biasing arm 206 and the first tip 208.

The second tip 214 may extend from the second lower biasing arm 212 such that the central axis 232 of the second lower biasing arm 212 and a central axis 250 of the second tip 214 define an angle 252 therebetween. In at least one approach, the angle 252 is an obtuse angle; i.e., in the range of greater than 90 degrees to less than 180 degrees. As an example, the angle may be approximately 110 degrees. As such, the retraction spring 200 may define a fourth bend 254 between the second lower biasing arm 212 and the second tip 214. The first and second tips 208, 214 may extend away from each other. The first and second tips 208, 214 may have a shorter length than the first and second lower biasing arms 206, 212. As an example, the first and second tips 208, 214 may have a length of between 3.0 and 9.0 mm.

Figure 5:
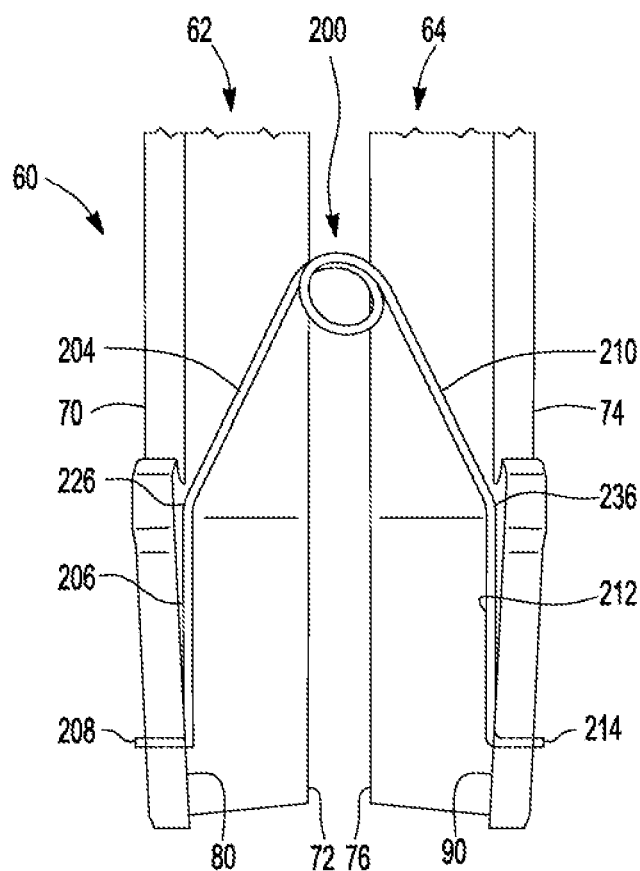
FIG. 5 is a perspective view showing the retraction spring assembled to the brake pad assemblies and in a compressed state.

Referring to FIG. 5, in the installed configuration or compressed state, the retraction spring 200 may be engaged with, and may extend between, the first and second brake pad assemblies 62, 64. For example, in the installed configuration, the retraction spring 200 may be engaged with, and may extend between the first and second backplates 70, 74 and may be spaced apart from the first and second friction materials 72, 76. Also in the installed configuration, the first lower biasing arm 206 may extend front the first upper biasing arm 204 to the first engagement interface 82 of the first backplate 70. At least a portion of the first tip 208 may be received within the first engagement interface 82. Also in the installed configuration, the second lower biasing arm 212 may extend from the second upper biasing arm 210 to the second engagement interface 92 of the second backplate 74. At least a portion of the second tip 214 may be received within the second engagement interface 92.

The first lower biasing arm 206 may engage the first backplate face 134 of the first backplate 70. The second lower biasing arm 212 may engage the first backplate face 154 of the second backplate 74.

The retraction, spring 200 may be adapted to impart multiple biasing forces at more than one region of one or both of the first and second backplates 70, 74. In at least one approach, the coil 202 may bias the first upper biasing arm 204 away from the second tipper biasing arm 210 and into contact with the first and second backplates 70, 74, respectively. As a result, the first and second upper biasing arms 204, 210 may help bias the upper regions of the first and second backplates 70, 74 away from each other and away from the rotor. An angle between the first and second upper biasing arms 204, 210 with respect to the coil 202 may be greater in the free state prior to installation as compared to after installation or in the compressed state. For instance, the angle may decrease from around 70-110 degrees before installation to less than 70 degrees after installation. In this way, the retraction spring 200 may be adapted to bias upper regions (e.g., upper half, upper third, upper quarter, etc.) of the first and second backplates 70, 74 away from the coil 202.

The first and second lower biasing arms 206, 212 may provide another biasing force on the first and second backplates 70, 74 when in the compressed state. In the compressed state, the angles 224, 234 may be smaller than in the free state. For instance, the angles 224, 234 may be greater than 110 degrees such that the first and second lower biasing arms 206, 212 extend away from each other in the free state as is best shown in FIG. 4, and the angle 224, 234 may decrease to less than 110 degrees and may be approximately 90 degrees when in the compressed state. As a result, the first and second lower biasing arms 206, 212 may help bias the lower regions (e.g., lower half, lower third, lower quarter, etc.) or bottom of the first and second backplates 70, 74 away from each other and away from the rotor since the first and second lower biasing arms 206, 212 extend downward to the lower half of the first and second backplates 70, 74. The first and second tips 208, 214 may secure the retraction spring 200 to the first and second backplates 70, 74, respectively, and may help direct the biasing force exerted by the first and second lower biasing arms 206, 212 to the lower half of the backplates.

Optionally, the first and second tips 208, 214 may also provide a biasing force on the first and second backplates 70, 74 when in the compressed state. In the compressed state, the angles 242, 252 may be smaller than in the free state. For instance, the angles 242, 252 may be greater than 110 degrees as is best shown in FIG. 4. The angle 242, 252 may decrease to less than 110 degrees and may be closer to 90 degrees when in the compressed state. As a result, the first and second tips 208, 214 may help bias the lower regions or bottom of the first and second backplates 70, 74 away from each other and away from the rotor.

In this way, the retraction spring 200 may be adapted to bias both upper and lower regions of the first and second backplates 70, 74. Biasing of upper and lower regions of the first and second backplates 70, 74 may improve brake pad assembly retraction. For example, uniform (or substantially uniform) forces acting on upper and lower regions of the first and second bookplates 70, 74 may assist in maintaining a parallel relationship of the first and second backplates 70, 74 during retraction of the first and second brake pad assemblies 62, 64. Moreover, providing a biasing force against the lower regions of the backplates may help concentrate retraction force near the bottom of the backplates where the amount of friction or drag between the backplates and the brake carrier that impairs retraction of the brake pad assemblies is greatest due to the contact between the lower side of a backplate and the brake carrier.

Referring to FIG. 6, an assembly 260 for a brake caliper may be provided. The assembly 260 may include a first brake pad assembly 262 and a second brake pad assembly 264. The first and second brake pad assemblies 262, 264 may generally correspond to the brake pad assemblies 24 of FIG. 2. The first brake pad assembly 262 may include a first backplate 270 and a first friction material 272 that may be secured to the first backplate 270. The second brake pad assembly 264 may include a second bookplate 274 and a second friction material 276 that may be secured to the second backplate 274. The first and second backplates 270, 274 and first and second friction materials 272, 276 may correspond to the bookplates 50 and friction material 52 of FIG. 2. In the assembled configuration, the second brake pad assembly 264 may be spaced apart from the first brake pad assembly 262.

The first backplate 270 may include a first end portion 280 that may extend beyond the first friction material 272. The first backplate 270 may also include a first engagement interface 282. The first engagement interface 282 may be at least partially disposed, for example, at an inboard surface of the first end portion 280. The first engagement interface 282 may be provided at an upper region of the first end portion 280. For example, the first engagement interface 282 may be provided within the upper half of a height of the first backplate 270. More particularly, the first engagement interface 282 may be provided within the upper third of a height of the first backplate 270. More particularly, the first engagement interface 282 may be provided within the upper quarter of a height of the first backplate 270.

In at least one approach, the first engagement interface 282 includes a receptacle that extends into the first backplate 270. In one example, the receptacle may be a hole. As such, the first engagement interface 282 may be referred to as a first hole 282 herein. The first hole 282 may be a through hole that extends through an entire thickness of the first backplate 270. In another example, the receptacle may be a blind hole that extends through less than an entire thickness of the first backplate 270. In still another approach, the first engagement interface includes a protrusion that may extend from the first backplate 270 (e.g., in a direction toward the second backplate 274). In still another approach, the first engagement interface 282 may include a plurality of receptacles, a plurality of protrusions, or a combination of one or more receptacles with one or more protrusions.

The first backdate 270 may further include a first diametric end portion 284 that may extend beyond the first friction material 272 opposite the first end portion 280. The first backplate 270 may also include a first diametric engagement interface 286. The first diametric engagement interface 286 may be at least partially disposed, for example, at an inboard surface of the first diametric end portion 284. The first diametric engagement interface 286 may be provided at an upper region of the first diametric end portion 284. For example, the first diametric engagement interface 286 may b provided within the upper half of a height of the first bookplate 270. More particularly, the first diametric engagement interface 286 may be provided within the upper third of a height of the first backplate 270. More particularly, the first diametric engagement interface 286 may be provided within the upper quarter of a height of the first backplate 270.

In at least one approach, the first diametric engagement interface 286 includes a receptacle that extends into the first backplate 270. In one example, the receptacle may be a hole.

As such, the first diametric engagement interface 286 may be referred to as a first diametric hole 286 herein. The first diametric hole 286 may be a through hole that extends through an entire thickness of the first backplate 270. In another example, the receptacle may be a blind hole that extends through less than an entire thickness of the first backdate 270. In still another approach, the first engagement interface includes a protrusion that may extend from the first bookplate 270 (e.g., in a direction toward the second backplate 274). In still another approach, the first diametric engagement interface 286 may include a plurality of receptacles, a plurality of protrusions, or a combination of one or more receptacles with one or more protrusions.

The second bookplate 274 may include a second end portion 290 that may extend beyond the second friction material 276. The second backplate 274 may also include a second engagement interface 292. The second engagement interface 292 may be at least partially disposed, for example, at an inboard surface of the second end portion 290. The second engagement interface 292 may be provided at an upper region of the second end portion 290. For example, the second engagement interface 292 may be provided within the upper half of a height of the second backplate 274. More particularly, the second engagement interface 292 may be provided within the upper third of a height of the second backplate 274. More particularly, the second engagement interface 292 may be provided within the upper quarter of a height of the second backplate 274.

In at least one approach, the second engagement interface 292 includes receptacle that extends into the second backplate 274. In one example, the receptacle may be a hole. As such, the second engagement 292 may be referred to as a second hole 292 herein. The second hole 292 may be a through hole that extends through an entire thickness of the second backplate 274. In another example, the receptacle may be a blind hole that extends through less than an entire, thickness of the second backplate 274. In still, another approach, the second engagement interface includes a protrusion that may extend from the second backplate 274 (e.g., in a direction toward the second backplate 274). In still another approach, the second engagement interface 292 includes a plurality of receptacles, a plurality of protrusions, or a combination of one or more receptacles with one or more protrusions.

The second backplate 274 may further include a second diametric end portion 94 that may extend beyond the second friction material 276 opposite the second end portion 290. The second backplate 274 may also include a second diametric engagement interface 296. The second diametric engagement interface 296 may be at least partially disposed, for example, at an inboard surface of the second diametric end portion 294. The second diametric engagement interface 296 may be provided at an upper region of the second diametric end portion 294. For example, the second diametric engagement interface 296 may be provided within the upper half of a height of the second backplate 274. More particularly, the second diametric engagement interface 296 may be provided within the upper third of a height of the second backplate 274. More particularly, the second diametric engagement interface 296 may be provided within the upper quarter of a height of the second backplate 274.

In at least one approach, the second diametric engagement interface 296 includes a receptacle that extends into the second backplate 274. In one example, the receptacle may be a hole. As such, the second diametric engagement interface 296 may be referred to as a second diametric hole 296 herein. The second diametric hole 296 may be a through hole that extends through an entire thickness of the second backplate 274. In another example, the receptacle may be a blind hole that extends through less than an entire thickness of the second backplate 274. In still another approach, the second engagement interface includes a protrusion that may extend from the second backplate 274 (e.g., in a direction toward the second backplate 274). In still another approach, the second diametric engagement interface 296 may include a plurality of receptacles, a plurality of protrusions, or a combination of one or more receptacles with one or more protrusions.

In at least one approach, the first friction material 272 may have a first lateral side 300 and a second lateral side 302. The second lateral side 302 may be disposed opposite the first lateral side 300. The first friction material 272 may further include an upper side 304. The upper side 304 may extend from the first lateral side 300 toward the second lateral side 302. The first friction material 272 may further include a lower side 306. The lower side 306 may be disposed opposite the upper side 304. The lower side 306 may also extend from the first lateral side 300 toward the second lateral side 302. The first friction material 272 may further include a back side 308. The back side 308 may extend between the first lateral side 300 and the second lateral side 302. The first lateral side 300 may extend between an end of the upper side 304 to an end of the lower side 306. The first lateral side 300 may by disposed parallel to the second lateral side 302.

In at least one approach, the second friction material 276 may have a first lateral side 310 and a second lateral side 312. The second lateral side 312 may be disposed opposite the first lateral side 310. The second friction material 276 may further include an upper side 314. The upper side 314 may extend from the first lateral side 310 toward the second lateral side 312. The second friction material 276 may further include a lower side 316. The lower side 316 may be disposed opposite the upper side 314. The lower side 316 may also extend from the first lateral side 310 toward the second lateral side 312. The second friction material 276 may further include a back side 318. The back side 318 may extend between the first lateral side 310 and the second lateral side 312. The first lateral side 310 may extend between an end of the upper side 314 to an end of the lower side 316. The first lateral side 310 may by disposed parallel to the second lateral side 312.

In at least one approach, the first backplate 270 may have a first lateral backplate side 330 and a second lateral backplate side 332. The second lateral backplate side 332 may be disposed opposite the first lateral bookplate side 330. The first backplate 270 may further include a first backplate face 334. The first backplate face 334 may engage the back side 308 of the first friction material 272. The first backplate face 334 may extend from the first lateral backplate side 330 to the second lateral bookplate side 332.

The first backplate 270 may have an upper bookplate side 336 and a lower backplate side 338. The lower backplate side 338 may be disposed opposite the upper backplate side 336. The upper side 304 and the upper backplate side 336 may face away from the lower side 306 and the lower backplate side 338.

The first backplate 270 may include the first hole 282. The first hole 282 may extend from the first backplate face 334. The first hole 282 may be positioned laterally along a lateral axis 340 and longitudinally along a longitudinal axis 342. The first hole 282 may be positioned laterally inboard with respect to the first lateral backplate side 330. The first hole 282 may be positioned laterally outboard with respect to the first lateral side 300. In at least one approach, the first hole 282 may be disposed closer to the upper side 304 than the lower side 306. The first hole 282 may be disposed closer to the upper backplate side 336 than the lower backplate side 338.

In at least one approach, the second backplate 274 may have a first lateral backplate side 350 and a second lateral backplate side 352. The second lateral backplate side 352 may be disposed opposite the first lateral backplate side 350. The second backplate 274 may further include a first backplate face 354. The first bookplate face 354 may engage the back side 318 of the second fiction material 276. The first backplate face 354 may extend from the first lateral backplate side 350 to the second lateral backplate side 352.

The second backplate 274 may have an upper backplate side 356 and a lower backplate side 358. The lower backplate side 358 may be disposed opposite the upper backplate side 356. The upper side 314 and the upper backplate side 356 may face away from the lower side 316 and the lower backplate side 358.

The second backplate 274 may include the second hole 292. The second hole 292 may extend from the first backplate face 354. The second hole 292 may be positioned laterally along a lateral axis 344 and longitudinally along a longitudinal axis 346. The second hole 292 may be positioned laterally inboard with respect to the first lateral side 310. In at least one, approach, the second hole 292 may be disposed closer to the upper side 314 than the lower side 316. The second hole 292 may be disposed closer to the upper backplate side 356 than the lower backplate side 358.

The first backplate 270 may have a plurality of tabs 360 that extend from the upper backplate side 336. The tabs 360 may extend in a direction that extends away from the lower backplate side 338. A tab 360 may be positioned between the first lateral backplate side 330 and the first lateral side 300. The first hole 282 and the first diametric hole 286 may be positioned in a tab 360.

The second backplate 274 may have a plurality of tabs 362 that extend from the upper backplate side 356. The tabs 362 may extend in a direction that extends away from the lower backplate side 358. A tab 362 may be positioned between the first lateral backplate side 350 and the first lateral side 310. The second hole 292 and the second diametric hole 296 may be positioned in a tab 362.

The Assembly 260 may further include one or more retraction springs 400. Although depicted with two retraction springs, the assembly 260 may be provided with one retraction spring, or three or more retraction springs.

Referring to FIG. 7, a retraction spring 400 may include a coil 402. The coil 402 may include a single coil or may include multiple coils. The retraction spring 400 may further include a first biasing arm 404 that extends from the coil 402. The retraction spring 400 may further include a first biasing tip 406. The first biasing tip 406 may extend at an oblique angle from an end of the first biasing arm 404.

The retraction spring 400 may further include a second biasing arm 410 that extends from the coil 402. The retraction spring 400 may further include a second biasing tip 412. The second biasing tip 412 may extend at an oblique angle front an end of the second biasing arm 410.

Referring to FIG. 8, in the uncompressed configuration or free state the coil 402 may define a center axis 420. A center plane 422 may extend orthogonal to the center axis 420. A first central axis 424 of the first biasing tip 406 may extend at a first oblique angle 426 relative to the center plane 422. A second central axis 430 of the second biasing tip 412 may extend at a second oblique angle 432 relative to the center plane 422 and in the same direction as the first biasing tip 406 or upward from the perspective shown. In at least one approach, at least one of the first oblique angle 426 and the second oblique angle 432 is in the range of approximately 1 degree to approximately 10 degrees. The first oblique angle 426 and the second oblique angle 432 may be substantially equal angles. For example, the first oblique angle 426 and the second oblique angle 432 may be approximately (e.g., +/−1 degree or +/−2 degrees) 5 degrees.

The first biasing arm 404 may define or extend along a central axis 440. The central axis 440 may be disposed in a plane that may be parallel to center plane 422. As such, the first, central axis 424 of the first biasing tip 406 may extend at an oblique angle relative to the plane of the central axis 440 of the first biasing arm 404.

The second biasing arm 410 may define a central axis 442. The central axis 442 may be disposed in is plane that may be parallel to center plane 422. As such, the second central axis 430 of the second biasing tip 412 may extend at an oblique angle relative to the plane of the central axis 442 of the second biasing arm 410. In at least one embodiment, the first and second biasing arms 404, 410 may have a length of around 95 mm and an included angle α with respect to each other about the central axis 440 of between 50 and 180 degrees. This angle α is depicted as being approximately 80 degrees in FIG. 7.

Figure 9:
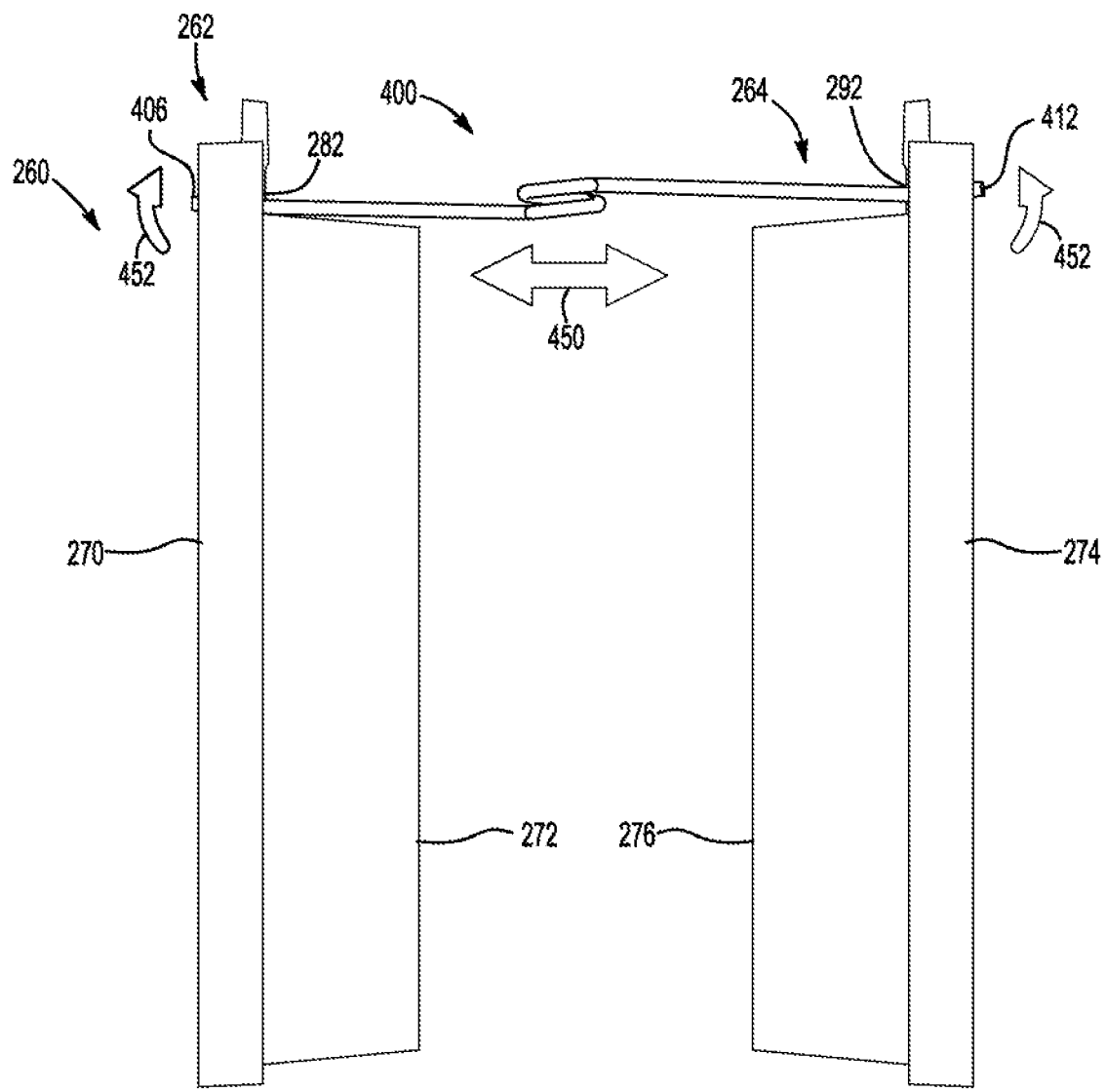
FIG. 9 is a side view showing the retraction spring assembled to the brake pad assemblies and in a compressed state.

Referring to FIG. 9, in the installed configuration, at least a portion of the first biasing tip 406 may be received in at least a portion of the first engagement interface 282. Also in the installed configuration, at least a portion of the second biasing tip 412 may be received in at least a portion of the second engagement interface 292. The first and second biasing tips 406, 412 may have a shorter length than the first and second biasing arms 404, 410. For instance, the first and second biasing tips 406, 412 may have a length of 3.0 to 9.0 mm.

The first and second biasing tips 406, 412 may be referred to as angled biasing tips. The first and second biasing tips 406, 412 may be oriented at an angle β of more than 90 degrees with respect to a corresponding biasing arm in a plan view as is shown in FIG. 7. In FIG. 7, this angle β is depicted as being approximately 110 degrees.

The retraction spring 400 may be adapted to impart multiple forces on the first and second brake pad assemblies 262, 264, and more particularly, on the first and second backplates 270, 274. A first force may be an outward force 450. The outward force 450 may be imparted due at least in part to the compression of the coil 402. The outward force 450 may bias the first and second biasing arms 404, 410 away from each other and may bias the upper portions of the first and second bookplates 270, 274 away from each other. A second force may be a rotational force 452 or "heel kick" force that may be exerted primarily by the first and second oblique angles 426, 432 of the biasing tips with respect to the center plane 422. The rotational force 452 may rotate the first and second backplates 270, 274 in opposite directions to bias the lower portions of the first and second backplates 270, 274 away from each other and away from the rotor.

In this way the retraction spring 400 may be adapted to bias both upper and lower regions of the first and second backplates 270, 274. Biasing of upper and lower regions of the first and second bookplates 270, 274 may improve brake pad assembly retraction. For example, uniform (or substantially uniform) forces acting on, upper and lower regions of the first and second backplates 270, 274 may assist in maintaining a parallel relationship of the first and second backplates 270, 274 during retraction of the first and second brake pad assemblies 262, 264.

Figure 10:
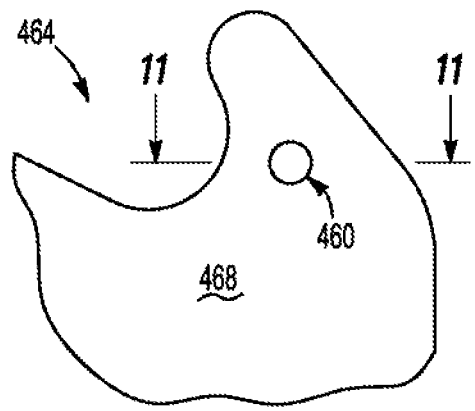
FIG. 10 is a magnified view of a portion of a brake pad assembly of FIG. 6 showing a hole.
Figure 11:
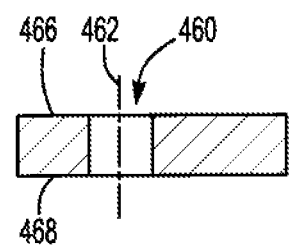
FIG. 11 is a section view along line 11-11.

Referring to FIGS. 10 and 11, an engagement interface 460, which may correspond to the engagement interfaces of FIG. 3 or the engagement interfaces of FIG. 6, may have a circular profile. As such, a central axis 462 of the engagement interface 460 may extend orthogonal to one or both of the inner surface 466 of a backplate 464 and an outer surface 468 of the backplate 464.

Figure 12:
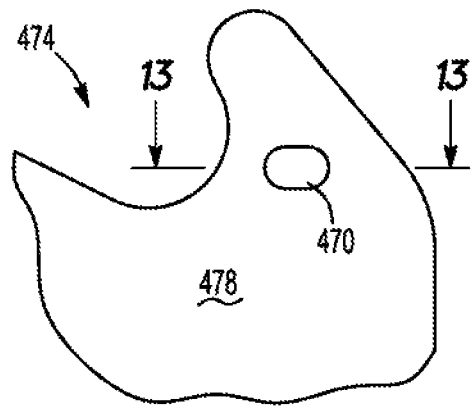
FIG. 12 is a magnified view of a portion of a brake pad assembly showing a hole configured as an elongated slot.
Figure 13:
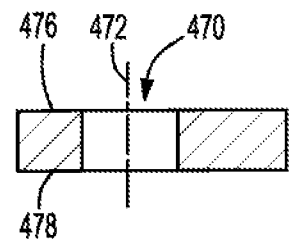
FIG. 13 is a section view along line 13-13.

Referring to FIGS. 12 and 13, an engagement interface 470, which may correspond to the engagement interlaces of FIG. 3 or the engagement interfaces of FIG. 6, may have an oblong (e.g., elongated rectangle or oval shape) profile. As such, a central axis 472 of the engagement interface 470 may extend orthogonal to one or both of the inner surface 476 of a backplate 474 and an outer surface 478 of the backplate 474.

Figure 14:
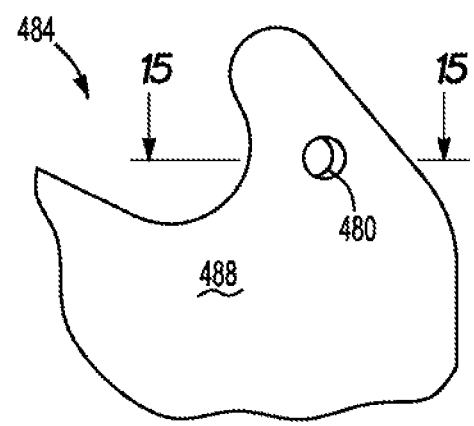
FIG. 14 is a magnified view of a portion of a brake pad assembly showing an angled hole.
Figure 15:
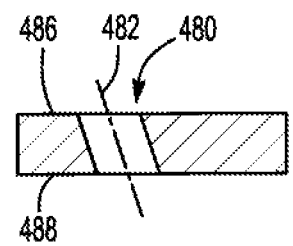
FIG. 15 is section view along line 15-15.

Referring to FIGS. 14 and 15, an engagement interface 480, which may correspond to the engagement interfaces of FIG. 3 or the engagement interfaces of FIG. 6, may have an angled profile. As such, a central axis 482 of the engagement interface 480 may extend at a non-perpendicular angle with respect to one or both of the inner surface 48 of a backplate 484 and an outer surface 488 of the backplate 484. The engagement interface 480 may extend further outboard or away from the friction material in a direction that extends away from the inner surface 486 upon which the friction material is disposed toward the outer surface 478. The angular orientation may help maintain the position of a retraction spring. For example, providing an engagement interface 480 at a non-perpendicular angle may help inhibit a retraction spring from rotating within the engagement interface 480 when installed, thereby helping keep the retraction spring from rotating into engagement with the rotor 30.

Figure 16:
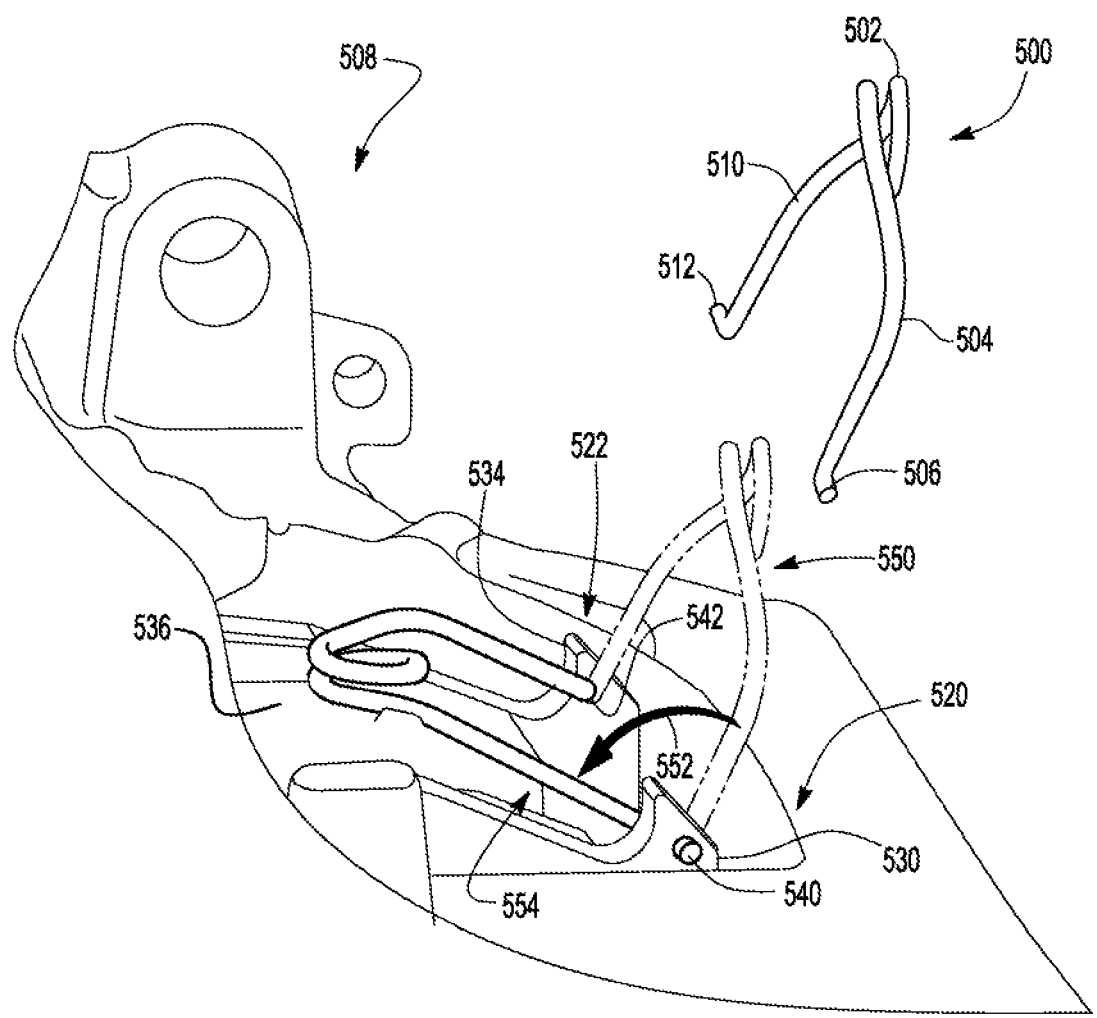
FIG. 16 is a perspective view depicting installation of a retraction spring.

Referring to FIG. 16, installation of a retraction spring 500 is shown. The retraction spring 500 may be installed in a brake assembly 508. The brake assembly 508 may generally correspond to the brake assembly 10 of FIGS. 1 and 2. As such, certain parts and reference numerals may not be repeated herein.

The retraction spring 500 may correspond to the retraction spring 400 of FIGS. 6-9. As such, the retraction spring 500 may include a coil 502. The coil 502 may include a single coil or may include multiple coils. The retraction spring 500 may further include a first biasing atm 504. The first biasing arm 504 may extend from the coil 502. The retraction spring 500 may further include a first biasing tip 506. The first biasing tip 506 may extend from the first biasing arm 504. The retraction spring 500 may further include a second biasing arm 510. The second biasing arm 510 may extend from the coil 502. The retraction spring 500 may further include a second biasing, tip 512. The second biasing tip 512 may extend from the second biasing arm 510. The first and second biasing tips 506, 512 may be angled biasing tips, as previously discussed.

The brake assembly 508 may include a first brake pad assembly 520 and a second brake pad assembly 522. The first and second brake pad assemblies 520, 522 may generally correspond to the first and second brake pad assemblies 262, 264 of FIGS. 6 and 9. The first brake pad assembly 520 may include a first backplate 530 and a first friction material that may be secured to the first backplate 530. The second brake pad assembly 522 may include a second backplate 532 and a second friction material 536 that may be secured to, the second backplate 532. The first and second backplates 530, 532 and friction material may generally correspond to the first and second backplates 270, 274, and first and second friction materials 272, 276 of FIGS. 6 and 9. In the assembled configuration, the second brake assembly 522 may be spaced apart from the first brake pad assembly 520.

The installation of the retraction spring 500 may include compressing the retraction spring 500 such that the coil is compressed. Compressing the retraction spring 500 may move at least a portion of the first biasing arm 504 and at least a portion of the second biasing arm 510 are moved intra closer spatial relation. Compressing the retraction spring 500 may also move the first biasing tip 506 and the second biasing tip 512 into closer spatial relation.

The installation of the retraction spring 500 may further include aligning the first biasing tip 506 with a first engagement interface 540 of the first backplate 530. The first engagement interface 540 may generally correspond to the engagement interface 460 of FIGS. 10 and 11, the engagement interface 470 of FIGS. 12 and 13, the engagement interface 480 of FIGS. 14 and 15, or still other engagement interface configurations. The installation of die retraction spring 500 may further include aligning the second biasing tip 512 with a second engagement interface 542 of the second backplate 532.

The installation of the retraction spring 500 may further include inserting the first biasing tip 506 into at least a portion of the first engagement interface 540. The installation of the retraction spring 500 may further include inserting the second biasing tip 512 into at least a portion of the second engagement interface 542.

During one or both of the aligning and inserting steps, the retraction spring 500 may be oriented in first angular orientation, indicated generally at 550. In the first angular orientation 550, the first and second biasing arms 504, 510 may extend vertically away from the first and second brake pad assemblies 520, 522.

The installation of the retraction spring 500 may further include rotating the retraction spring 500, indicated, generally at 552, to a second angular orientation, indicated generally at 554. The angle of rotation 552 may be in the range of approximately 10 degrees to approximately 135 degrees and may move the coil over the rotor and toward the center of the brake pad assemblies. As depicted, the retraction spring 500 may be rotated approximately 90 degrees from the coil being in a generally vertical position to the coil being in a generally horizontal position. This configuration may help simplify assembly by allowing the retraction spring to be positioned in a highly accessible, vertical position, to compress the retraction spring and allow the biasing tips to be inserted between the brake pad assemblies and inserted into the holes in the backplates and then rotated to a final installation position in which the retraction springs are rotated close to the housing assembly to help avoid damage and provide a compact overall assembly configuration. In addition, the retraction spring and holes in the brake pad assemblies may cooperate to provide a biasing force that may bias the retraction spring away from the rotor when in the final installation position to help prevent the retraction spring from contacting the rotor. The retainer bracket may be installed over the retraction spring after rotating the retraction spring into the final installation position to prevent the retraction spring from rotating further away from the rotor or into contact with a vehicle wheel.

Figure 17:
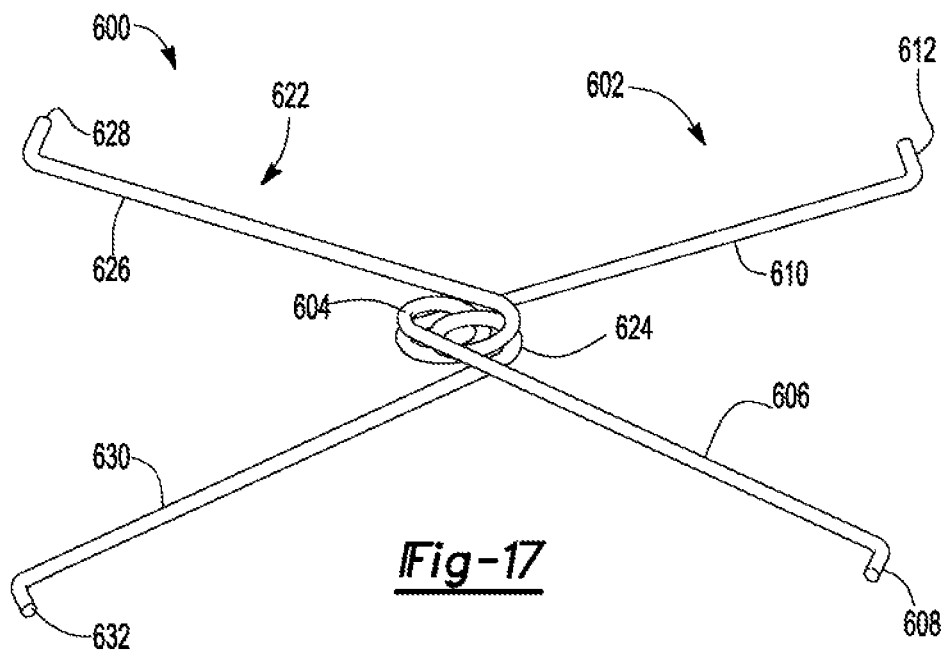
FIG. 17 is a perspective view of a retraction spring assembly having a pair of retraction springs.

Referring to FIG. 17, a retraction spring assembly 600 may be provided. The retraction spring assembly 600 may include first and second retraction springs 602, 622. In at least one approach, the first and second retraction springs 602, 622 are identical (or substantially identical) in configuration.

A first retraction spring 602 may include a first coil 604. The first coil 604 may include a single coil or may include multiple coils. A first retraction spring 602 may further include a first biasing arm 606. The first biasing arm 606 may extend from the first coil 604. A first retraction spring 602 may further include a first biasing tip 608. The first biasing tip 608 may extend from the first biasing arm 606. A first retraction spring 602 may further include a second biasing arm 610. The second biasing arm 610 may extend from the first coil 604. A first retraction spring 602 may further include a second biasing tip 612. The second biasing tip 612 may extend from the second biasing arm 610. The first and second biasing tips 608, 612 may be angled biasing tips, as previously discussed.

As such, a first retraction spring 602 may generally correspond to the retraction spring 500 of FIGS. 6-9. However, one or both of the first and second biasing arms 606, 610 may be provided with an extended length to achieve an interlocking feature.

A second retraction spring 622 may include a second coil 624. The second coil 624 may include a single coil or may include multiple coils. A second retraction spring 622 may further include a third biasing arm 626. The third biasing arm 626 may extend from the second coil 624. A second retraction spring 622 may further include a thud biasing tip 628. The third biasing tip 628 may extend from the third biasing arm 626. A second retraction spring 622 may further include a fourth biasing arm 630. The loud biasing arm 630 may extend from the second coil 624. A second retraction spring 622 may further include, a fourth biasing tip 632. The fourth biasing tip 632 may extend from the fourth biasing arm 630. The third and fourth biasing tips 628, 632 may be angled biasing tips, as previously discussed.

As such, a second retraction spring 622 may generally correspond to the retraction spring 500 of FIGS. 6-9. However, one or both of the third and fourth biasing arms 626, 630 may be provided with an extended length to achieve an interlocking feature.

The retraction spring assembly 600 may include first and second retraction, springs 602, 622 provided in an interlocking fashion. For example, at least a portion of the first biasing arm 606 of the first retraction spring 602 may cross at least a portion of the fourth biasing arm 630 of the second retraction spring 622. At least a portion of the third biasing arm 626 of the second retraction spring 622 may cross at least a portion of the second biasing arm 610 of the first retraction spring 602. Optionally, the first coil 604 may be disposed in contact with the second coil 624.

Figure 18:
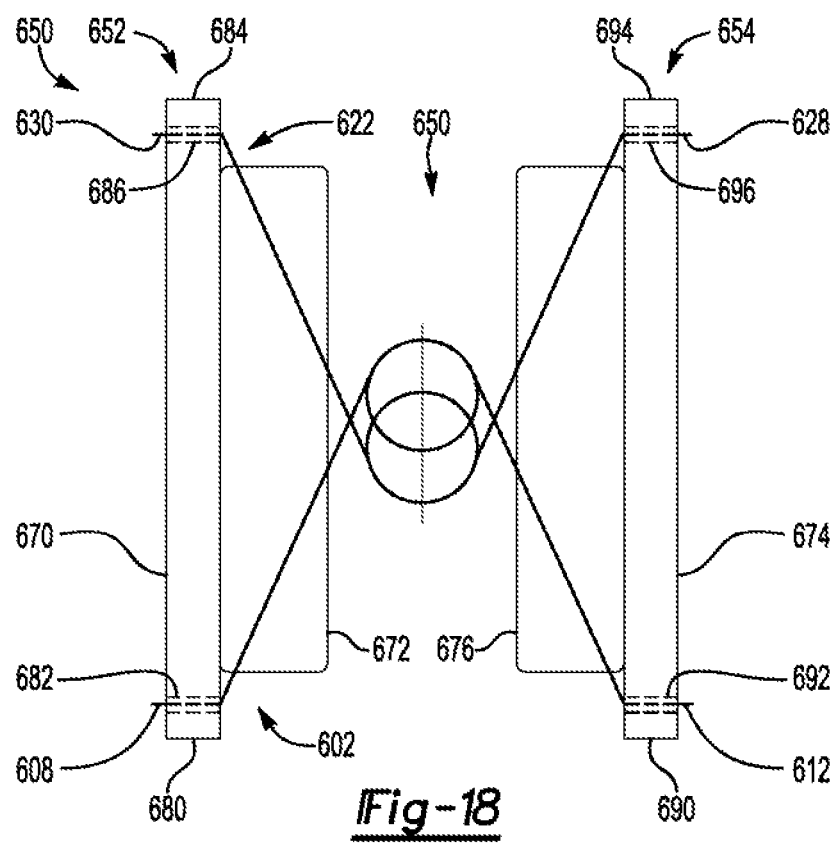
FIG. 18 is a top view illustrating the retraction springs of FIG. 17 assembled to brake pad assemblies and in a compressed state.

Referring to FIG. 18, the first and second retraction springs 602, 622 of the retraction spring assembly 600 may be installed in an assembly 650 for a brake caliper. The assembly 650 may include a first brake pad assembly 652 and a second brake pad assembly 654. The first and second brake pad assemblies 652, 654 may generally correspond to the brake pad assemblies 24 of FIG. 2. The first brake pad assembly 652 may include a first backplate 670 and a first friction material 672 that may be secured to the first backplate 670. The second brake pad assembly 654 may include a second backplate 674 and a second friction material 676 that may be secured to the second backplate 674. The first and second backplates 670, 674 and first and second friction materials 672, 676 may correspond to the backplates 50 and friction material 52 of FIG. 2. In the assembled configuration, the second brake pad assembly 654 may be spaced apart from the first brake pad assembly 652.

The first backplate 670 may include a first end portion 680 that may extend beyond the first friction material 672. The first backplate 670 may also include a first engagement interface 682. The first engagement interface 682 may be at least partially disposed, for example, at an inboard surface of the first end portion 680. The first engagement interlace 682 may be provided at an upper region of the first end portion 680. For example, the first engagement interface 682 may be provided within the upper half of a height of the first backplate 670. More particularly, the first engagement interface 682 may be provided within the upper third of a height of the first backplate 670. More particularly, the first engagement interface 682 may be provided within the upper quarter of a height of the first backplate 670.

In at least one approach, the first engagement interface 682 includes a receptacle that extends into the first backplate 670. In one example, the receptacle may be a through hole that extends through an entire thickness of the first backplate 670. In another example, the receptacle may be a blind hole that extends through less than an entire thickness of the first backplate 670. In still another approach, the first engagement interface includes a protrusion that may extend from the first backplate 670 (e.g., in a direction toward the second backplate 674). In still another approach, the first engagement interface 682 includes a plurality of receptacles, a plurality of protrusions, or a combination of one or more receptacles with one or more protrusions.

The first backplate 670 may further include a first diametric end portion 684 that may extend beyond the first friction material 672 opposite the first end portion 680. The first backplate 670 may also include a first diametric engagement interface 686. The first diametric engagement interface 686 may be at least partially disposed, for example, at an inboard surface of the first diametric end portion 684. The first diametric engagement interface 686 may be provided at an upper region of the first diametric end portion 684. For example, the first diametric engagement interface 686 may be provided within the upper half of a height of the first backplate 670. More particularly, the first diametric engagement interface 686 may be provided within the upper third of a height of the First backplate 670. More particularly, the first diametric engagement interface 686 may be provided within the upper quarter of a height of the first backdate 670.

In at least one approach, the first diametric engagement interface 686 includes a receptacle, that extends into the first backplate 670. In one example, the receptacle nay be a through hole that extends through an entire thickness of the first backdate 670. In another example, the receptacle may be a blind hole that extends through less than an entire thickness of the first backplate 670. In still another approach, the first engagement interface includes a protrusion that may extend from the first backplate 670 (e.g., in a direction toward the second backplate 674). In still another approach, the first diametric engagement interface 686 includes a plurality of receptacles, a plurality of protrusions, or a combination of one or more receptacles with one or more protrusions.

The second backplate 674 may include a second end portion 690 that may extend beyond the second friction material 676. The second backplate 674 may also include a second engagement interface 692. The second engagement interface 692 may be at least partially disposed, for example, at an inboard surface of the second end portion 690. The second engagement. Interface 692 may be provided at an upper region of the second end portion 690. For example, the second engagement interface 692 may be provided within the upper half of a height of the second backplate 674. More particularly, the second engagement interface 692 may be provided within the upper third of a height of the second backplate 674. More particularly, the second engagement interface 692 may be provided within the upper quarter of a height of the second backplate 674.

In at least one approach, the second engagement interface 692 includes a receptacle that extends into the second backplate 674. In one example, the receptacle may be a through hole that extends through an entire thickness of the second backplate 674. In another example, the receptacle may be a blind hole that extends through less than an entire thickness of the second backplate 674. In still another approach, the second engagement interface includes a protrusion that may extend from the second backdate 674 (e.g., in a direction toward the second backdate 674). In still another approach, the second engagement interface 692 includes a plurality of receptacles, a plurality of protrusions, or a combination of one or more receptacles with one or more protrusions.

The second backplate 674 may further include a second diametric end portion 694 that may extend beyond the second friction material 676 opposite the second end portion 690. The second backplate 674 may also include a second diametric engagement interface 696. The second diametric engagement interface 696 may be at least partially disposed, for example, at an inboard surface of the second diametric end portion 694. The second diametric engagement interface 696 may be provided at an upper region of the second diametric end portion 694. For example, the second diametric engagement interface 696 may be provided within the upper half of a height of the second backplate 674. More particularly, the second diametric engagement interface 696 may be provided within the upper third of a height of the second backplate 674. More particularly, the second diametric engagement interlace 696 may be provided within the upper quarter of a height of the second backplate 674.

In at least one approach, the second diametric engagement interface 696 includes a receptacle that extends into the second backplate 674. In one example, the receptacle may be a through hole that extends through an entire thickness of the second backplate 674. In another example, the receptacle may be a blind hole that extends through less than an entire thickness of the second backplate 674. In still another approach, the second engagement interface includes a protrusion that may extend from the second backplate 674 (e.g., in a direction toward the second backplate 674). In still another approach, the second diametric engagement interface 696 includes a plurality of receptacles, a plurality of protrusions, or a combination of one or more receptacles with one or more protrusions.

In the installed configuration, the first retraction spring 602 may installed such at least a portion of the first biasing tip 608 may be received in at least a portion of the first engagement interface 682. Also in the installed configuration, at least a portion of the second biasing tip 612 may be received in at least a portion of the second engagement interface 692.

Also in the installed configuration, the second retraction spring 622 may installed such at least a portion of the third biasing, tip 628 may be received in at least a portion of the second diametric engagement interlace 696. Also in the installed configuration, at least a portion of the fourth biasing tip 632 may be received in at least a portion of the first diametric engagement interface 686.

The first and second retraction springs 602, 622 of the retraction spring assembly 600 may be installed in an interlocking fashion. For example, at least a portion of the first biasing arm 606 of the first retraction spring 602 may cross at least a portion of the fourth biasing arm 630 of the second retraction spring 622. At least a portion of the third biasing arm 626 of the second retraction spring 622 may cross at least a portion of the second biasing arm 610 of the first retraction spring 602. Optionally, the first coil 604 may be disposed in contact with the second coil 624.

Interlocking installation of the first and second retraction springs 602, 622 of the retraction spring assembly 600 may reduce or inhibit rotation of the first and second retraction springs 602, 622. For example, rotation of the first retraction spring 602 may be inhibited due at least in part to engagement with the second retraction spring 622. Similarly, rotation of the second retraction spring 622 may be inhibited due at least. In part to engagement with the first retraction spring 602.

The retainer bracket 28 may extend across and may engage the retraction springs one or more of the configurations previously discussed to help further secure the retraction springs and inhibit rotation of the retraction springs.

In any of the configurations previously discussed, the tips of a retraction spring may engage or contact an associated backplate in the hole in the backplate. The hole may be sized to permit insertion of a tip while allowing at least an upper or top side of the tip to engage or contact the backplate in the hole, thereby allowing force to be transmitted from the retraction spring to the backplate and may also allow the retraction spring to exert the torsional force on the backplate that helps kick out the bottom of the backplate away from the rotor. As a result, the retraction spring may help keep a brake pad assembly parallel to the rotor or in a generally perpendicular orientation to the rotational axis of the rotor throughout its range of movement and preventing the bottom of a brake pad assembly from tiling into engagement with the rotor, which can result in uneven wear of the friction material and possibly damage brake components.

While exemplary embodiments are described above, it is not intended that these embodiments describe all possible forms of the invention. Rather, the words used in the specification are words of description rather than limitation, and it is understood that various changes may be made without departing from the spirit a id scope of the invention. Additionally, the features of various implementing embodiments may be combined to form further embodiments of the invention,

What is claimed is:

1. A brake assembly comprising:
   a first brake pad assembly that includes:
      a friction material having a first lateral side, a second lateral side that is disposed opposite the first lateral side, an upper side that extends from the first lateral side toward the second lateral side, and a back side that extends between the first lateral side and the second lateral side; and
      a first backplate having a first lateral backplate side, a second lateral backplate side disposed opposite the first lateral backplate side, a first backplate face that engages the back side of the friction material and extends from the first lateral backplate side to the second lateral backplate side, and a first hole that extends from the first backplate face and is positioned along a lateral axis between the first lateral side and the first lateral backplate side and is positioned along a longitudinal axis below the upper side of the friction material, wherein the longitudinal axis is disposed perpendicular to the lateral axis; and a retraction spring that is partially received in the first hole, wherein the retraction spring has a coil, a first upper biasing arm that extends from the coil, a first lower biasing arm second angle from an end of the first lower biasing arm, wherein the first lower biasing arm is longer than the first upper biasing arm and the tip is received in the first hole.

2. The brake assembly of claim 1 wherein the first backplate has an upper backplate side and a lower backplate side that is disposed opposite the upper backplate side, wherein the first hole is disposed closer to the lower backplate side than the upper backplate side.

3. The brake assembly of claim 2 wherein the upper side of the friction material and the upper backplate side of the backplate face away from a lower side of the friction material and the lower backplate side, and the first hole is completely disposed between the upper side and the lower side of the friction material.

4. The brake assembly of claim 3 wherein the first hole is disposed closer to the lower side of the friction material than to the upper side of the friction material.

5. The brake assembly of claim 1 wherein the first hole is disposed closer to the first lateral side of the friction material than to the first lateral backplate side.

6. The brake assembly of claim 1 wherein the retraction spring has a second upper biasing arm that extends from the coil toward a second brake pad assembly, a second lower biasing arm that extends at an angle from an end of the second upper biasing arm, and a second tip that extends at an angle from an end of the second lower biasing arm, wherein the second tip is received in a hole in the second brake pad assembly, the second brake pad assembly has a second friction material disposed on a second backplate, wherein the first backplate of the first brake pad assembly and the second backplate of the second brake pad assembly each have a lower backplate side that contacts a brake carrier, wherein the coil biases the first and second upper biasing arms toward the first and second backplates, respectively, and the first lower biasing arm and the second lower biasing arms urge the lower backplate side of the first backplate and the lower backplate side of the second backdate away from each other.

7. A brake assembly comprising:
a first brake pad assembly that includes:
a friction material having a first lateral side, a second lateral side that is disposed opposite the first lateral side, an upper side that extends from the first lateral side toward the second lateral side, a lower side that is disposed opposite the upper side and extends from the first lateral side toward the second lateral side, and a back side that extends between the first lateral side and the second lateral side; and
a first backplate having a first lateral backplate side, a second lateral backplate side disposed opposite the first lateral backplate side, a first backplate face that engages the back side of the friction material and extends from the first lateral backplate side to the second lateral backplate side, and a first hole that extends from the first backplate face and is positioned laterally outboard with respect to the first lateral side and is positioned laterally inboard with respect to the first lateral backplate side; and
a second brake pad assembly that includes a second friction material disposed on a second backplate that has a second hole, wherein the first backplate of the first brake pad assembly and the second backplate of the second brake pad assembly each have a lower backplate side that contacts a brake carrier; and a retraction spring that is partially received in the first and second holes, wherein the retraction spring has a coil that extends around a center axis, first and second biasing arms that extend from the coil, and first and second biasing tips that extend from ends of the first and second biasing arms, respectively, wherein the first and second biasing tips are received in holes in the first and second backplates, respectively, and exert a biasing force that rotates the lower backplate sides of the first and second backplates away from each other.

8. The brake assembly of claim 7 wherein the first backplate has a second backplate face that is disposed opposite the first backplate face, wherein the first hole is disposed at an oblique angle with respect to the first backplate face and the second backplate face.

9. The brake assembly of claim 8 wherein the first hole is disposed at an angle with respect to the first backplate face and the second backplate face such that an opening of the first hole in the first backplate face is disposed further from the first lateral backplate side than an opening of the first hole in the second backplate face.

10. The brake assembly of claim 7 wherein the first backplate has an upper backplate side that is disposed opposite the lower backplate side, wherein the first hole is disposed closer to the upper backplate side than the lower backplate side.

11. The brake assembly of claim 10 wherein a tab extends from the upper backplate side in a direction that extends away from the lower backplate side, the tab is laterally positioned between the first lateral backplate side and the first lateral side and the first hole is positioned in the tab.

12. The brake assembly of claim 7 wherein the first biasing arm is disposed substantially parallel to a center plane that is disposed perpendicular to the center axis and the first biasing tip is disposed at an oblique angle ($\beta$) with respect to the first biasing arm and at a first oblique angle with respect to the center plane.

13. The brake assembly of claim 12 wherein the second biasing tip is disposed at an oblique angle with respect to the second biasing arm and at a second oblique angle with respect to the center plane.

14. The brake assembly of claim 7 wherein
the brake assembly has a second retraction spring that includes:
a second coil;
third and fourth biasing arms that extend from the second coil;
a third biasing tip that extends from an end of the third biasing arm and is received in a third hole that is provided in the first backplate; and
a fourth biasing tip that extends from an end of the fourth biasing arm and is received in a fourth hole that is provided in the second backplate of the second brake pad assembly, wherein the retraction spring contacts the second retraction spring.

15. A method of assembling a brake assembly, the method comprising:
providing a first brake pad assembly and a second brake pad assembly that each include:
a friction material having a first lateral side, a second lateral side that is disposed opposite the first lateral side, an upper side that extends from the first lateral side toward the second lateral side, a lower side that is disposed opposite the upper side and extends from the first lateral side toward the second lateral side, and a back side that extends between the first lateral side and the second lateral side; and a backplate having a first lateral backplate side, a second lateral backplate side disposed opposite the first lateral backplate side, a first backplate face that engages the back side of the friction material and extends from the first lateral backplate side to the second lateral backplate side, and a hole that extends from the first backplate face;

providing a retraction spring that includes:

a coil that extends around a center axis and intersects a center plane that extends orthogonal to the center axis;

first and second biasing arms that extend from the coil;

a first biasing tip that extends along a first central axis from an end of the first biasing arm; and a second biasing tip that extends along a second central axis from an end of the second biasing arm, wherein the first central axis extends at a first oblique angle relative to the center plane, and the second central axis extends at a second oblique angle relative to the center plane when the retraction spring is in a free state; and positioning the first biasing tip in the hole in the backplate of the first brake pad assembly and positioning the second biasing tip in the hole of the second brake pad assembly.

16. The method of claim 15 further comprising rotating the retraction spring with respect to the hole in the backplate of the first brake pad assembly and the hole of the second brake pad assembly to move the coil toward a center of the first brake pad assembly and a center of the second brake pad assembly.

17. The method of claim 15 wherein the hole is positioned laterally outboard with respect to the first lateral side and is positioned laterally inboard with respect to the first lateral backplate side.

18. The method of claim 15 wherein the first biasing tip and the second biasing tip are disposed on opposite sides of the center plane of the retraction spring when the retraction spring is in the free state.

19. The method of claim 15 wherein the first biasing tip extends toward the center plane and the second biasing tip extends away from the center plane when the retraction spring is in the free state.

20. The method of claim 15 wherein the first and second biasing tips are disposed at an angle ($\beta$) of more than 90 degrees with respect to the first and second biasing arms, respectively.

* * * * *